US007552075B1

(12) United States Patent
Walsh

(10) Patent No.: US 7,552,075 B1
(45) Date of Patent: Jun. 23, 2009

(54) METHOD, APPARATUS AND COMPUTER-BASED PROGRAM FOR EXCLUSIVE INVESTMENT OF DEBENTURE CREDIT

(76) Inventor: William F. Walsh, 3129 Valley Rd., Basking Ridge, NJ (US) 07920

( * ) Notice: Subject to any disclaimer, the term of this patent is extended or adjusted under 35 U.S.C. 154(b) by 1012 days.

(21) Appl. No.: 09/588,389

(22) Filed: Jun. 6, 2000

Related U.S. Application Data

(63) Continuation-in-part of application No. 09/253,880, filed on Feb. 22, 1999, now abandoned.

(51) Int. Cl.
G06Q 40/00 (2006.01)
(52) U.S. Cl. .................................................. 705/36 R
(58) Field of Classification Search ............. 705/35–37, 705/38
See application file for complete search history.

(56) References Cited

U.S. PATENT DOCUMENTS

| | | | | | |
|---|---|---|---|---|---|
| 4,876,648 | A | * | 10/1989 | Lloyd ........................... | 705/38 |
| 4,953,085 | A | * | 8/1990 | Atkins ........................... | 705/36 |
| 5,644,727 | A | * | 7/1997 | Atkins ........................... | 705/40 |
| 5,852,811 | A | * | 12/1998 | Atkins ........................... | 705/36 |
| 5,864,828 | A | * | 1/1999 | Atkins ........................... | 705/36 |
| 5,884,285 | A | * | 3/1999 | Atkins ........................... | 705/36 |
| 5,911,136 | A | * | 6/1999 | Atkins ........................... | 705/36 |
| 6,185,543 | B1 | * | 2/2001 | Galperin et al. ............... | 705/38 |
| 6,233,566 | B1 | * | 5/2001 | Levine et al. .................. | 705/37 |

OTHER PUBLICATIONS

Karl Klugel, Mark White, and Richard Osborne; Securitization of the Bankers Acceptance Market; 1997; International Journal of Commerce & Management; vol. 7, 3/4; p. 6-17.*
Raymond Perry; Accounting for Securitizations; Sep. 1993; Accounting Horizons; vol. 7, No. 3; pp. 71-82.*
Michael Buckley; Portfolio Disposition Strategies: The Institutional Decision of the Decade; Aug. 1994; Real Estate Issues; pp. 29-34.*

* cited by examiner

Primary Examiner—James Kramer
Assistant Examiner—Samuel Weis
(74) Attorney, Agent, or Firm—Dilworth Paxson LLP; John W. Goldschmidt, Jr.; Philip J. Foret

(57) ABSTRACT

A method and system that produces a single financial product including a security arrangement, legal agreement(s) and technical management facility that aggregates the values of present or future financial cash flows from financial arrangements or securities offered by multiple entities such that the assets and liabilities are combined through agreements and other such arrangements to produce an enhanced portfolio value of the financial products.

15 Claims, 5 Drawing Sheets

Net Worth Mortgage

METHOD, APPARATUS AND COMPUTER-BASED PROGRAM FOR EXCLUSIVE INVESTMENT OF DEBENTURE CREDIT

This application is a continuation-in-part patent application of co-pending U.S. application Ser. No. 09/253,880 filed Feb. 22, 1999.

BACKGROUND OF THE INVENTION

1. Field of the Invention

The present invention relates to a system for a single financial package that may include securities, arrangements, legal agreements and technical management facility that facilitates execution and aggregates financial cash flows from financial arrangements or securities offered by multiple entities such that the assets and liabilities are either directly or indirectly altered, collateralized, borrowed-against and/or redirected, and combined to produce an enhanced portfolio value of the financial products. The preferred embodiment of the invention relates to an electronic management facility that aggregates, reports and analyzes the performance of the package of assets, such as investments, and liabilities, such as loan obligations. The same management facility will provide significant operational and distribution capacity through a browser based internet application that brings providers of financial products together into a synthesized financial package.

2. Description of the Prior Art

Recently, there has been a proliferation of financial products that provide greater flexibility and more customized solutions to both borrowers and investors.

Additionally there is an increasing sophistication in financial cash management. This sophistication has generated a proliferation of processes surrounding a comprehensive risk management of assets and liabilities. Sophisticated risk management systems have evolved in financial firms as a means to manage their in-house financial positions. Further, financial firms are beginning to provide similar services to their retail customers for management of in-house products.

The various means of implementing, coordinating, supervising, analyzing and reporting on an array of investments in an array of accounts within a financial institution are evolving as a service and used as a vehicle to encourage the purchase of multiple financial service products from the institution. While such means also may provide a level of efficient cash flow management, it is currently not possible for a retail customer to manage a combination of asset and liability products from multiple entities in such a personal risk management system. The many choices of wholly separate financial products can not be transacted and managed in a comprehensive asset/liability management product. Additionally, there is a possibility to unlock value tied-up in implicit assets and liabilities within traditional investment products.

In the current institutional marketplace, the traditional investment method is as follows:

1. The Homeowner has liability account (mortgage lender) with a lending institution and pays monthly interest and principal payments to the lender.
2. The Lender sells the loans through federal agency loan buying programs, to Federal Agencies such as Fannie Mae.
3. The Agency repackages the cash flow streams into securitized pools and sells them to institutional investors.
4. The Agencies are left with default exposure on the purchased loans.
5. The Agencies aggregate their default exposure and create default securities and sells them to other investors.

While the traditional approach creates some value for investors, there remains untapped value in the securities as the principal payments of the aggregated loans are paid to the lending institutions.

Adkins, U.S. Pat. No. 5,852,811 issued Dec. 22, 1998, discloses a computer-embodied method for handling both the creation of a mortgage together with investments that are handled by the same lending and investing institution. Adkins, U.S. Pat. No. 5,644,727 issued Jul. 1, 1997, is directed to a computer based system for operating a plurality of client financial accounts; Adkins, U.S. Pat. No. 4,953,085 issued Aug. 28, 1990, is directed towards a account and sub-account allocation by the disclosed method.

However, in light of the above-mentioned systems and methods there remains a need for a many-to-many match between mortgage lending institutions and asset management institutions, and a computer-processed product that is a combination of two existing products; a securitized loan (such as a home mortgage), an asset management package (such as a mutual fund) and a mechanism to generate and utilize implicit value through explicit asset and liability cash-flows which would allow financial institutions to maintain and benefit from their existing good-will and brand-recognition.

In addition, there is a need for a method/system for creating more value out of traditional real estate investment vehicles and securities.

SUMMARY OF THE INVENTION

The present invention is a method and system that produces a single financial package including a security arrangement, legal agreement(s) and technical management facility that aggregates the values of present or future financial cash flows from financial arrangements or securities offered by multiple entities such that the assets and liabilities are combined through agreements and other such arrangements to produce an enhanced portfolio value of the financial products.

DETAILED DESCRIPTION OF THE PREFERRED EMBODIMENTS

Figure 1:
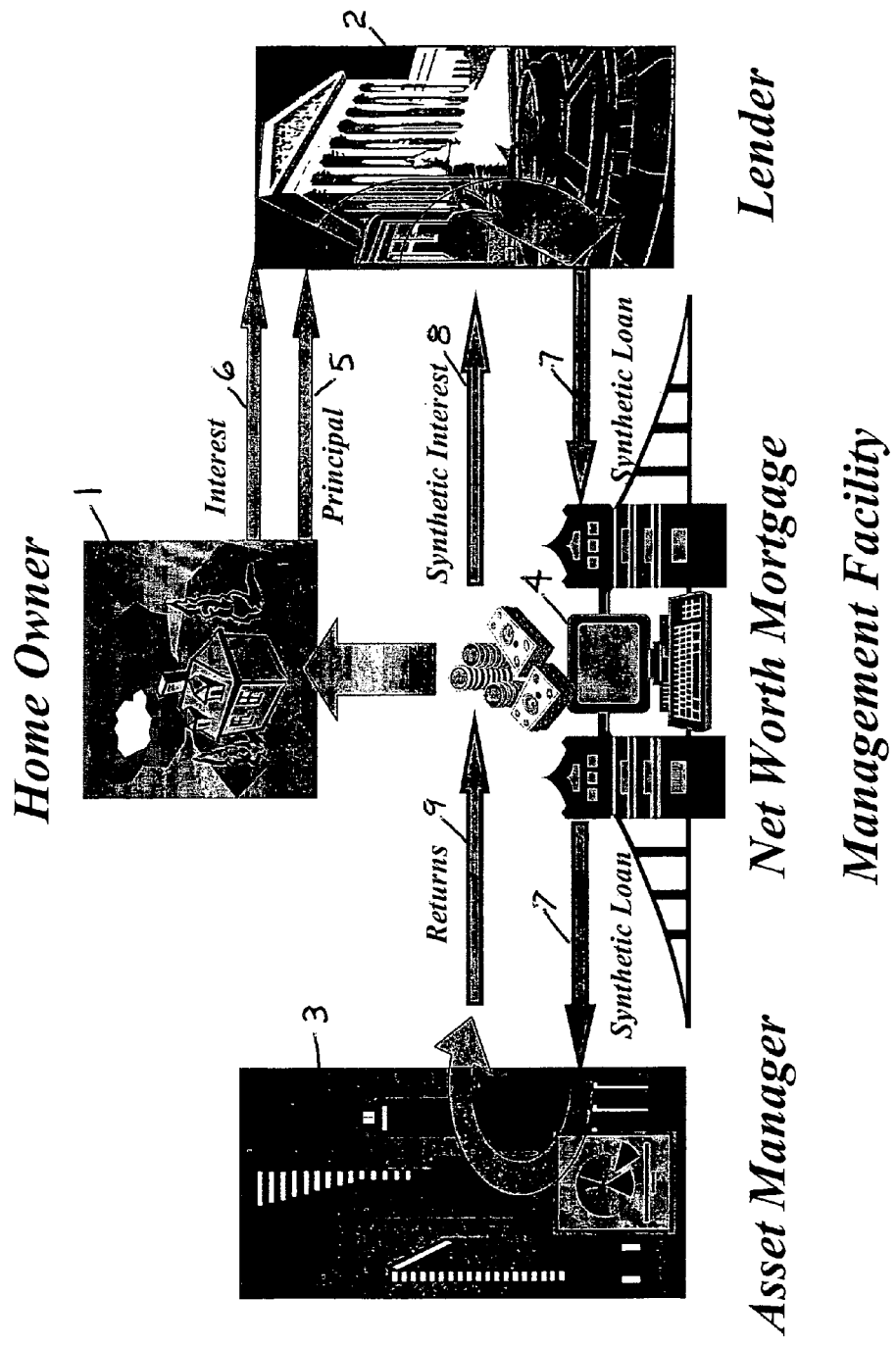
FIG. 1 shows a block diagram of the preferred embodiment of the invention.

The combination of asset and liability management in a single product enhances the prospects of net borrowing at less-expensive values. Similarly, the combination of asset and liability management in a single product can enhance the leverage of an investor. Thus, a user who is both an investor and a borrower can enhance the total efficiency of his/her position by combining separate financial products in a comprehensive package. While the efficiency of cash-flow management can be achieved through a comprehensive asset/liability package, further enhanced efficiency can be achieved through the combination of products from specialists' financial entities into this single package.

Principally, the asset management entity and the lending entity will separately administer their respective products and additionally, will collaterally agree to manage the cash flows through the combined asset/liability package in accordance with the participation provisions or legal agreements. The borrowing agreement with the participating lender will stand as a legal arrangement consistent with the provisions of conventional agreements. The lending agreement will be priced and maintained at observable market levels. Similarly, the asset management products will be administered by the asset management entities consistent with separate management agreements. The performance of such products will be simultaneously administered in the combined hybrid package. The participation agreement will link the separate products into a single package.

Some individual asset or liability products contain implicit assets and/or liabilities. For example, a loan obligation requires that the principal reduction payments are at regular intervals at a negotiated interest rate. This principal reduction reduces the liability of the borrower. As this liability is reduced, less interest is paid to the lending institution. Therefore, every reduction in principal can be viewed as an investment against a future obligation to pay interest. This investment portion of the overall liability product represents an implicit asset investment vehicle.

The present invention provides for the re-direction of this implicit asset within a liability obligation such that the implicit asset will be eliminated through either another implicit or explicit liability (contained within the agreement of the product) with the cash-flows from the liability funding, being directed into an explicit asset vehicle. For example, the principal payments on a loan are not effectively used to reduce the net liability of a borrower, but rather refunded and used to invest elsewhere. In the case of providing enhanced efficiency to liability holders, one of the novel aspects of the present invention is that the single product of the present invention, through various methods converts an implicit asset imbedded in the liability obligation into an explicit asset to be managed alongside the liability as an explicit (and presumably more efficient) portfolio of both assets and liabilities.

Similarly, buying an asset investment product requires that a lump sum of money be used to purchase the asset investment vehicle. To make this payment, cash must ultimately be debited from an account. Therefore, the purchaser implicitly borrows from another asset account. Whether the asset borrowed against is a savings account paying interest, a margin account requiring interest, or another investment forgoing some rate of return, it is clear that a cost/liability is associated with the purchase of an asset investment. The cost of the purchase of an investment is currently not explicitly accounted for within investment vehicles. The current invention provides a structure whereby an investor can purchase assets with implied assets contained in the liability of a loan (principal amortization schedule), whereby the principal payments on a loan are effectively directed into asset investments rather than used to pay down the net liability obligation of the borrower. In other words, the asset investment product is structure such that the funding of the investment is included in the product. Advantages of this structure include the possibility that an investor can leverage a liability to purchase assets and/or that an investor can possibly fund an asset purchase more efficiently than through other conventional means.

The hybrid financial product is structured such that an individual can enter into a conventional lending agreement with a traditional cash-flow structure. An amendment to the lending agreement would provide the individual the right and/or obligation to redirect the scheduled principal amortization cash flows from the lender. The principal cash flows would be passed-through the management facility onto an asset management partner. The asset management returns will be monitored and reported in the management facility and combined with the loan obligation to create a complete asset/liability performance model.

The facility may aggregate low level information about the cash flows from the lending entity and returns on the investment vehicles on a customer level. The accounts may be held in trust. The investment returns may be received directly or indirectly from the asset manager of record. The liability cash flows will be generated from the lending partners' records. The two assets of records will be joined on the investor level. Loan equity analysis and reports will document the principal accumulation in the combined package. Analyses contrasting accelerated home equity performance versus home equity accumulation with a conventional principal paydown schedule will be generated. Additionally, an asset/liability allocation model or performance model may graphically represent the current total wealth picture verses interactive assumptions on back-tested and projected performance under conventional and redirected principal schedules.

There are several ways in which to structure arrangements that would utilize the cash-flows from implicit assets and liabilities. The present invention is the method for transferring implicit cash-flows within an individual's portfolio into explicit cash-flows by combining assets and liabilities in a single structure that can be measured and managed and redirected by the individual. Some of the agreements used to create these structures are Separately administered Agreements.

The entities may maintain separate agreements with the customer while all of the parties agree to have one of many types of agreements to which all parties have certain obligations to the aggregated product to be differentiated by the specific manner by which the cash-flows are transferred.

Single integrated agreement are agreements in which all parties agree to have their legal obligations with regard to their respective products to be transferred to the aggregating entity.

Within the general structure of either the separate customer legal relationships or a single customer legal relationship there exists many types of arrangements that the cash-flows can pass through. In addition to others, a particular cash-flow structure may utilize any or all of the following arrangements or agreements;

1. An Umbrella Agreement: A legal document that defines the cash-flows for all parties.
2. A Management Facility Agreement/Arrangement Agreement/Arrangement that allows a service entity to handle all cash-flows of all the parties and is the record manager. The Management Facility is computer-based in the preferred embodiment.
3. A Custody/Trust: A regulated entity that houses the financial products and has fiduciary responsibilities for the security of the cash-flows.
4. A Performance Security: A SEC regulated security that pays on a determined formula that references the underlying instruments.
5. A Customer Level Account: A third party customer account balance which, is used to determine buying power of the aggregated assets and liabilities.

Utilizing any of the above-mentioned arrangements, a cash-flow event can be created in many ways. Each arrangement will embed costs or market frictions would make each mechanism more or less feasible. Examples of ways to create a cash-flow event are:

1. A Synthetic Loan: The lending institution may agree to loan back the principal payments to the borrower who in turn directs such flows to the asset management entity.
2. A Pass through Agreement: The agreement with the lender would allow the borrower to effectively send principal payments through the aggregation entity to the asset management entity. The agreement would include some provision for the return of principal to the lender.
3. Collateral: The asset balance reflected in one of many places can be used as collateral from which asset investments can be purchased. The lender can accept future interest payments with pledged collateral whereby the borrower can fund the purchase of asset investments. Other lenders can fund the purchase of assets with pledged collateral. The asset balance may or may not occur from the built-up equity in the liability.
4. Notional Agreement: Any of the entities may agree to exchange cash-flows based on a predetermined formula. For example, the aggregating entity may agree to pay the customer the difference between their accumulated asset investment returns and an interest rate multiplied by the outstanding loan balance multiplied by a day count.

As stated above, there are numerous ways in which to create a cash-flow event and the examples mentioned above, are not meant in any way to limit the scope of the invention.

Systems and methods which, fulfill the above-mentioned needs and provide other beneficial features in accordance with the present invention are described below with reference to the figures. Those skilled in the art will readily appreciate that the description given herein with respect to the figures is for explanatory purposes only and is not intended in any way to limit the scope of the invention. In addition, common reference numbers are used throughout the figures to represent common elements.

Referring now to the figures, FIG. 1 shows a system block diagram of a preferred embodiment of the present invention. The product called Net-Worth Mortgage is produced as follows. The Homeowner 1, pays monthly principal payments 5, and interest 6, to Lender 2, who accepts principal and interest payments from Homeowner 1, through a legal agreement. Through a second agreement, the principal payments in the form of a synthetic loan 7, are directed back to the control of the homeowner 1, who utilizes a financial management system 4, to direct the principal into an asset management vehicle 3.

The Net Worth Mortgage Management Facility 4, is the central operating account through which all transactions between the Lender 2, and Asset Manager 3, are implemented, coordinated, controlled, analyzed and reported to the client. Through the Net Worth account the client is provided with client reports updated on a real time basis, portfolio management and financial services, including personal financial planning services.

Figure 2:
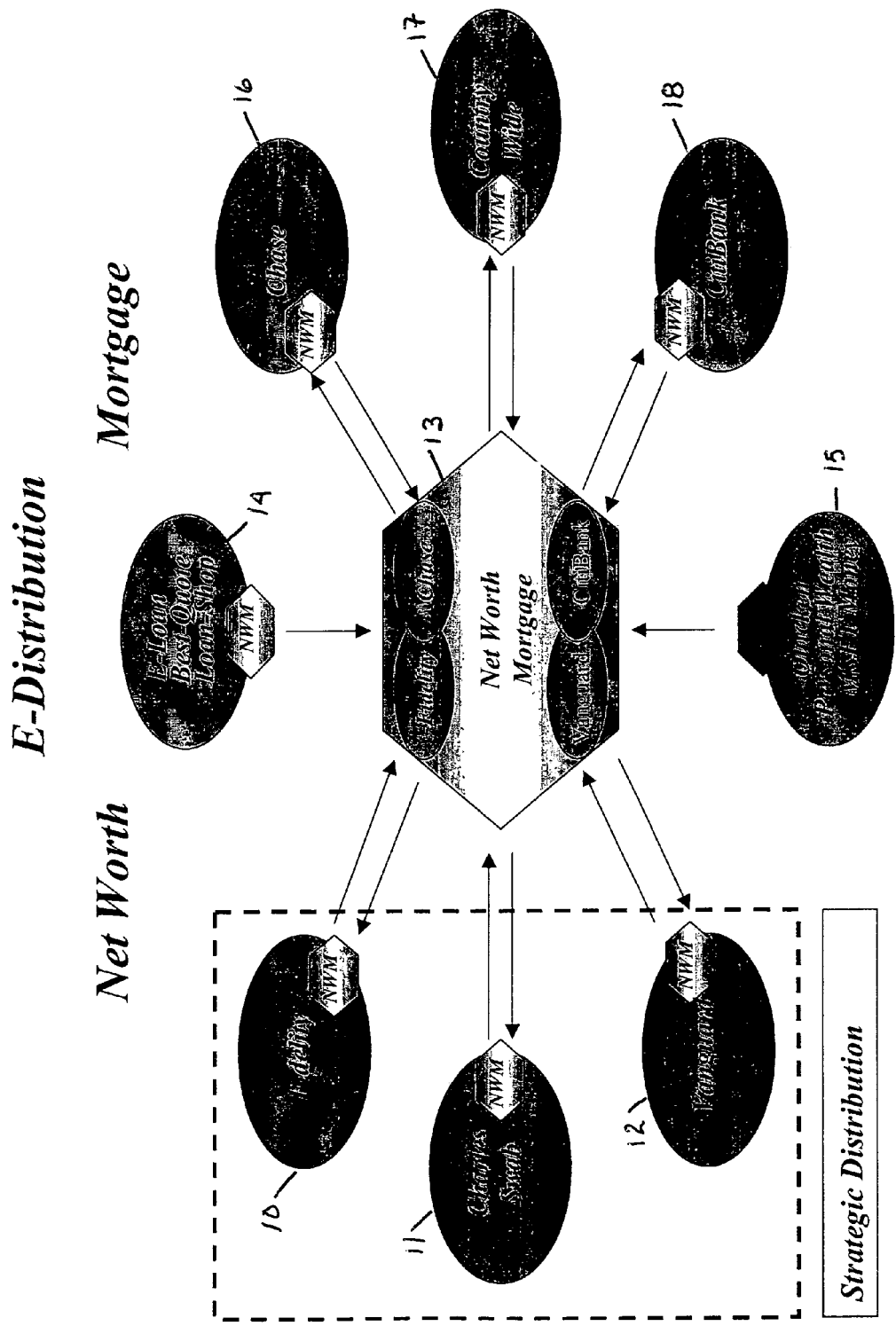
FIG. 2 shows the many to many matching of products that are combined to produce the invention.

FIG. 2 shows the many-to-many match of the preferred embodiment. The Net Worth mortgage 13, is a financial product that is a combination of asset and liability accounts. Reference numbers 10-12 shows examples of asset managers such as Fidelity 10, Charles Schwab 11, and Vanguard 12. Reference numbers 16-18 show examples of liability accounts i.e. mortgage lenders, such as Chase 16, Country Wide 17 and Citibank 18. Another embodiment of the present invention contains an Asset management tool, 15 for example Quicken, Personal Wealth, or Microsoft Money, and provision to allow quotes for mortgage loans 14, for example, E-Loan, Best-Quote or Loan Shop.

Figure 3:
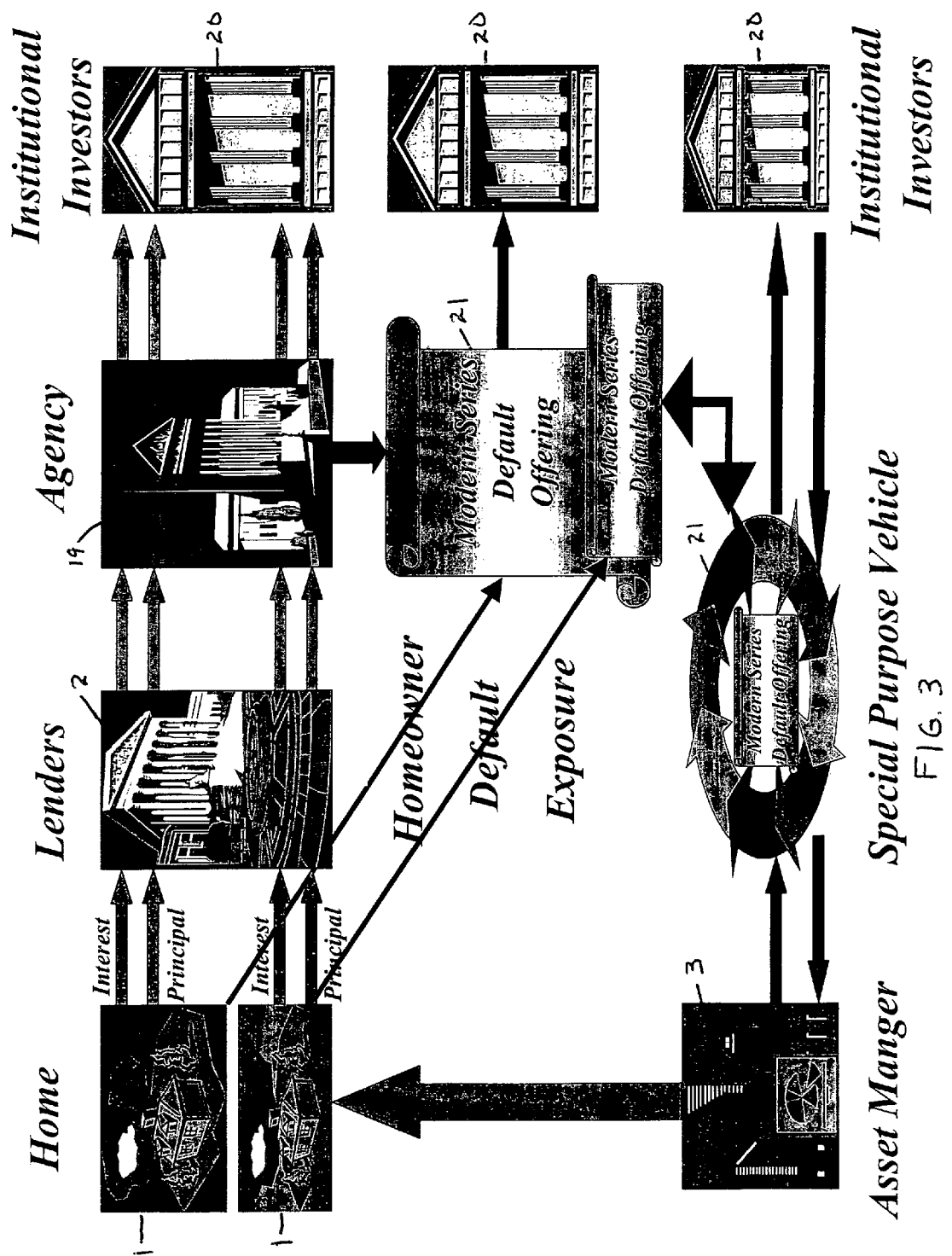
FIG. 3 shows the preferred embodiment of the present that utilizes the special trust or investment vehicle.

FIG. 3 is an example of another embodiment of the present invention that shows how the value of the financial product is enhanced. Homeowners 1 pay interest and principal to mortgage lenders 2. Lenders 2, then sells the loans through specified federal agency loan buying programs, to Federal Agency 19, for example, Fannie Mae. The Agency 19 repackages the cash flow streams into securitized pools and sells them to institutional investors 20. The Agency 19 is left with default exposure on the specified purchased loans. The Agency 19 aggregates the specified default exposure and creates default securities. The specified default securities will then be placed into a special purpose vehicle 21 identified herein as the Financial Asset Securitization Investment Trust (FASIT). As the principal payments of the loans are made, the net present value of the FASIT increases because the default exposure to the loans decreases. The FASIT is structured such that cash flows will pass from an investor through the FASIT as values for the securities increase. As the principal payments are passed through to the lender/agency/security/trust, the cash flows are passed to a customer-directed Asset Manager 3.

Figure 5:
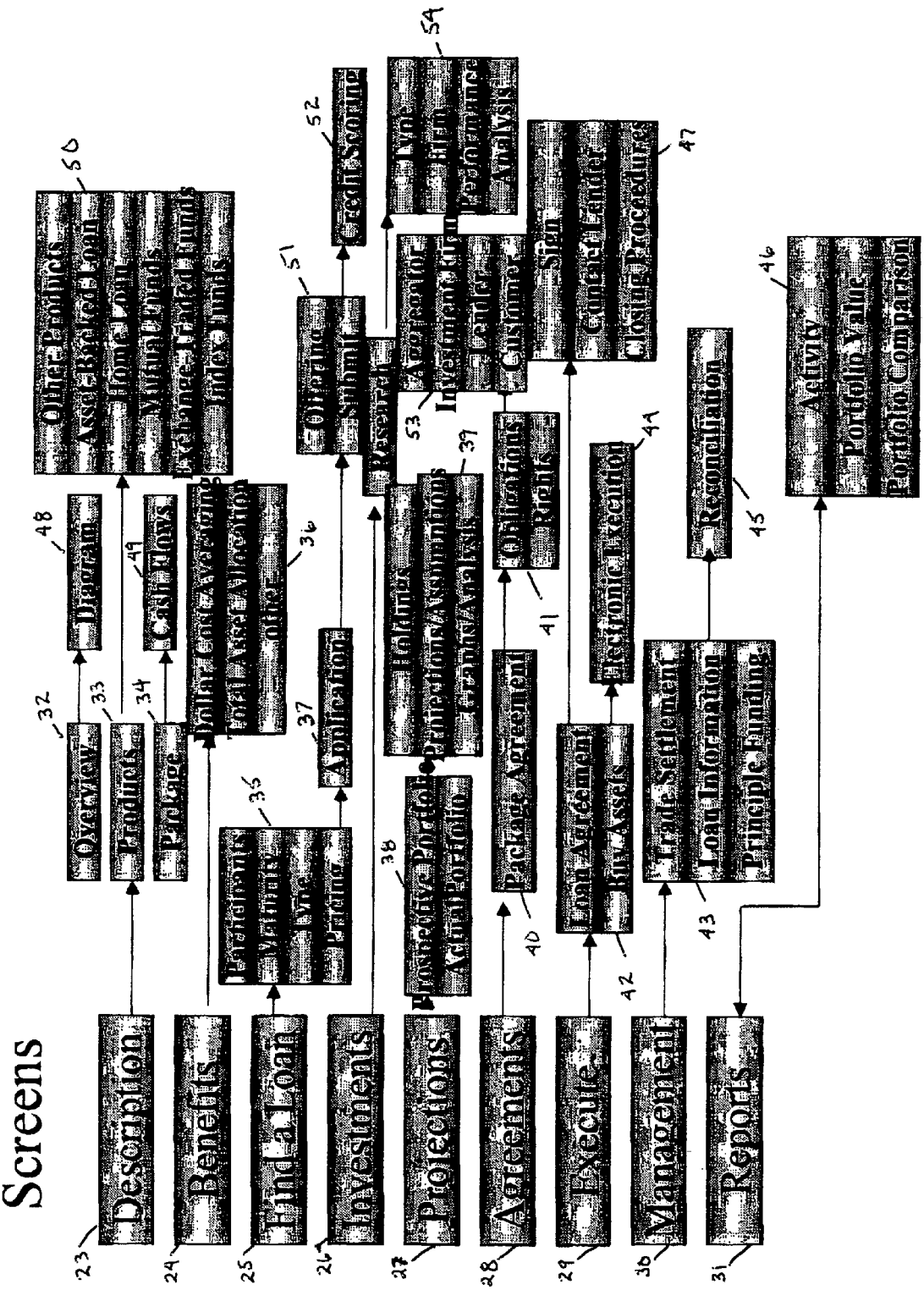
FIG. 5 shows a sample hierarchy of screens for the menu choice system.

The client is able to choose from a plurality of asset managers and from a plurality of mortgage lenders. In the preferred embodiment, the client can choose from a plurality of asset managers through a menu choice system, which also allows the client to view performance data. For example, the menu choice system of the present invention a shown in FIG. 5, would allow a client to view pertinent information such as, Projections of earnings 27, Agreements 28, Execute 29 and Management 30.

Figure 4:
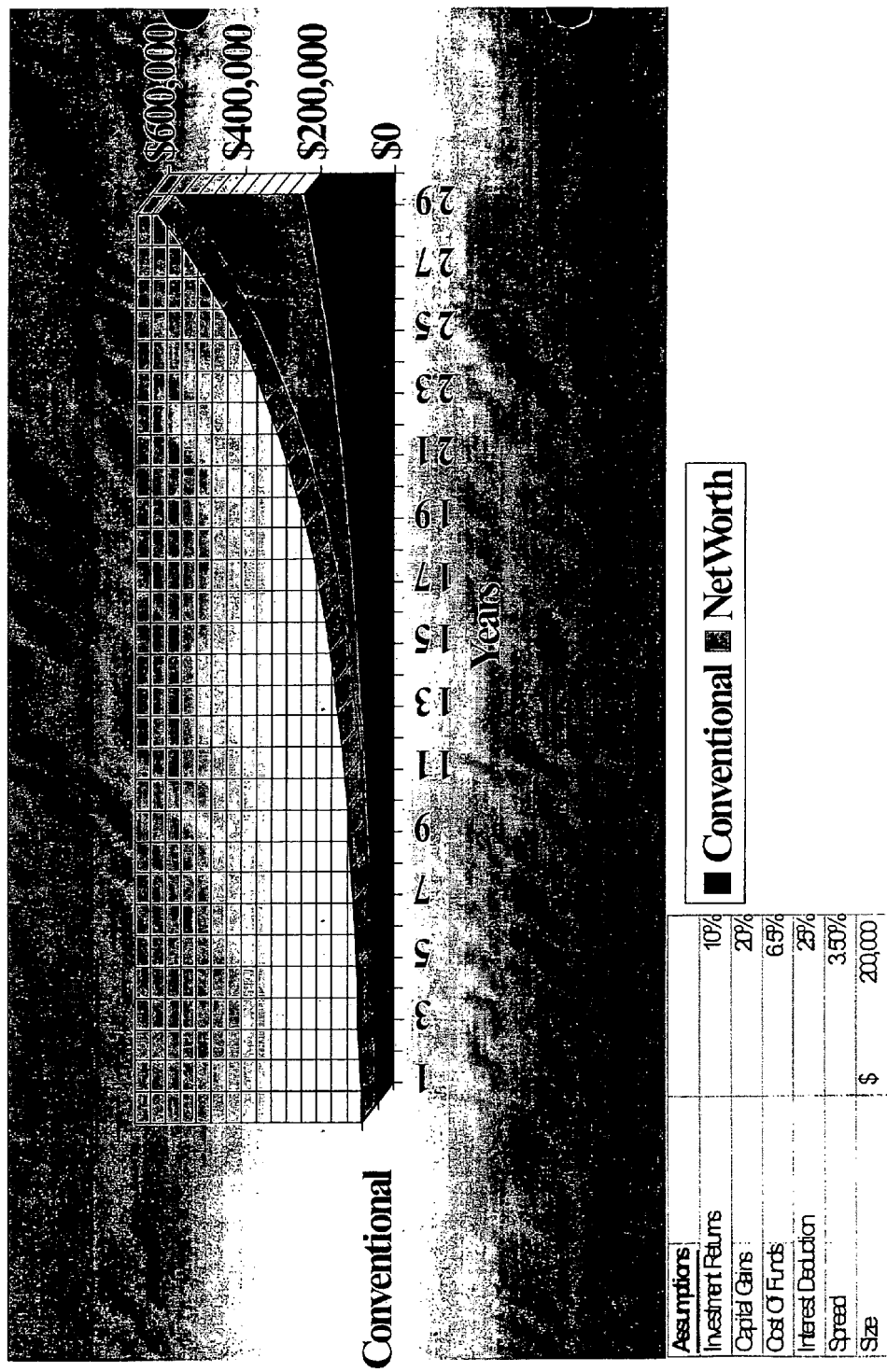
FIG. 4 shows an example of a performance model.

Performance data can consist of a comparison between the NetWorth mortgage and asset performance verses a conventional mortgage. An example of performance data is shown in FIG. 4.

Those skilled in the art will readily appreciate that the description given herein with respect to the figures is for explanatory purposes only and is not intended in any way to limit the scope of the invention.

I claim:

1. A computerized method for the management and satisfaction of a customer's financial liability comprising:

receiving a liability of said customer comprising default exposure, and a right to receive regular payments of principal and interest in satisfaction of said liability, wherein a liability vehicle based upon said liability may be selected by said customer from more than one lender of said liability vehicle, and sold to a third party agent;

aggregating said liability of said customer and liabilities of other customers into a securitized pool, wherein each said liability comprises default exposure and a right to receive regular payments, and wherein said agent repackages each said right to receive said regular payments into said securitized pool, and may sell at least a portion of each said right to receive said regular payments to a securitized pool investor;

receiving a default security created by said agent, wherein said default security is based upon said default exposure of said liabilities, wherein said default exposure of each said liability is associated with said customer contributing said liability to said pool, has a net present value, may be purchased by a default security investor, and said net present value of said default security increases as said regular payments of principal and interest associated with each liability are made; and maintaining an asset management account independent of said lender, wherein investments in said asset management account are directed by said customer, and said asset management account is managed by an asset management account manager;

calculating cash flows generated by said default security, wherein portions of said cash flows are attributable to each said liability of each said customer and are available to purchase said investments at the direction and for the benefit of said customer;

tracking said cash flows which fund said investments in said asset management account;

calculating a return on investment generated from said management account; and allocating said return on investment to said customer, which may be used to satisfy said liability, and at least one of said lender, third party agent, and said asset management account manager in accordance with an allocation agreement between two or more of said customer, said lender, said third party agent, and said asset management account manager, wherein said receiving a liability step, said receiving a default security step, said maintaining an asset management account, said calculating cash flows step, said tracking said cash flows step, and said allocating said return on investment step are performed by a computerized system comprising at least a processor.

2. The method of claim 1, wherein said default security is placed into a special purpose vehicle.

3. The method of claim 2, wherein said special purpose vehicle comprises a financial asset securitization investment trust.

4. The method of claim 3, wherein said cash flows pass from a default security investor through said trust.

5. The method of claim 3, wherein said payments are passed through said agency and then to said default security.

6. The method of claim 3, wherein said payments are passed through to said agency, then to said default security, and then to said trust.

7. The method of claim 1, wherein said third party agent comprises a Federal agency, a private investor, an institutional investor, said customer, said lender, or said asset manager.

8. The method of claim 7, wherein said Federal agency is Fannie Mae or Freddy Mac.

9. The method of claim 1, wherein said customer may choose from more than one asset managers.

10. The method of claim 1, wherein said customer may choose from more than one lenders of said liability.

11. The method of claim 9, wherein said asset manager may be chosen from said more than one asset managers through a menu choice system.

12. The method of claim 11, wherein said menu choice system permits said customer to view asset performance data.

13. The method of claim 11, wherein said menu choice system may allow said customer to view one or more of: projections of earnings information; agreement information; execution information; and management information.

14. The method of claim 12, wherein said performance data may comprise a comparison between liability and asset performance verses another liability vehicle.

15. The method of claim 14, wherein said liability comprises a net worth mortgage and said other liability vehicle comprises a conventional mortgage.

* * * * *